2,886,596
PROCESS FOR THE PRODUCTION OF CYCLOHEXANONE OXIME

Herbert Meister and Walter Franke, Marl, Westphalia, Germany, assignors to Chemische Werke Huls Aktiengesellschaft, a corporation of Germany No Drawing. Application January 6, 1953
Serial No. 329,925

Claims priority, application Germany January 8, 1952

5 Claims. (Cl. 260—563)

This invention relates to a process for the production of cyclohexanone oxime from nitrocyclohexane. It is known that nitrocyclohexane can be converted into cyclohexanone oxime by reduction by using as the reducing agent metals such as magnesium, aluminum, zinc, iron etc., or salts such as stannous salts, titanous salts, etc., or hydrogen sulfide or catalytically activated hydrogen. Such processes have not proven to be satisfactory because they require large amounts of accessory materials and give in many cases only poor yields.

In the search for ways of avoiding these disadvantages a new process has been found. If one reduces nitrocyclohexane catalytically with hydrogen, using catalyzers containing palladium, at temperatures between 0° and 50° C., the conversion into cyclohexylhydroxylamine takes place easily and almost completely. The cyclohexylhydroxylamine may then easily be oxidized at temperatures between 0° and 100° C. to cyclohexanone oxime.

For the conversion of nitrocyclohexane into cyclohexylhydroxylamine palladium catalysts in which the palladium, as metal, is deposited upon a carrier such as calcium carbonate, aluminum oxide, barium sulfate, active charcoal, etc., may be used. The palladium content of the catalyzer advantageously is within the range from 0.05% to 5% by weight. Especially good results are obtained when the catalyst contains 1% of palladium. Catalyzers with more than 3% of palladium tend to produce cyclohexylamine as a byproduct. The same danger exists when the palladium catalyst for any other reason is too active. This danger can be avoided by introducing a material which reduces catalytic activity such as a heavy metal, e.g. lead or an organic compound such as quinoline or a salt of an organic acid with an organic base in quantity amounting to from about 0.01 to 10% of the weight of the catalyst. No general rule can be given for the activity reducing action of such additions. It is advisable in every instance to determine the suitability of a catalyst by preliminary tests and to empirically determine the necessary reduction of its activity by addition of the above mentioned materials. Such preliminary experiments will determine also the best quantity of catalyzer to use which generally is within the range from 1% to 20% based upon the nitrocyclohexane.

Suitable reaction temperatures for the reduction lie within the range from 0° to 50° C. The most suitable temperature depends upon the catalyst used and is best determined by preliminary experiment. In the use of catalyzers containing 1% of palladium deposited upon calcium carbonate the best temperature is within the range 15° to 20° C. whereas with a catalyst containing 1% of palladium on aluminum oxide the best temperature is within the range 10° to 15° C. If the temperature used is higher than 20° C. the production of cyclohexylamine will in general be excessive and if the reaction temperature is below 5° C. the reaction generally will be too slow.

The pressure at which the reaction is carried out has relatively little influence on the reaction. It generally is preferable to carry out the process at about atmospheric pressure but it is possible to carry it out at superatmospheric pressures.

The cyclohexylhydroxylamine formed by the reduction is separated from the reaction mixture and especially from the palladium catalyst and is then oxidized to cyclohexanone oxime with molecular oxygen within the temperature range from 0° to 100° C. The molecular oxygen may be used in the form of pure oxygen or in the form of air. Suitable catalysts for this reaction are e.g. copper powder, Raney-nickel, copper chromite, silver chromite, palladium, advantageously supported on a carrier, alkaline materials such as sodium hydroxide, potassium hydroxide, organic bases, etc. An especially suitable embodiment of the process uses the same palladium catalyst as that used in the reduction. Thus one may avoid the separation of the cyclohexylhydroxylamine from the reaction mixture. The activity of the palladium catalyst in the oxidation step is improved by the addition of a small amount of alkali metal hydroxide for example 0.5% to 10% of sodium or potassium hydroxide based on the weight of the catalyst.

The temperature for the oxidation step is within the range from 0° C. to 100° C. The most suitable temperature depends upon the character of the oxidizing agent. When the oxidizing agent is an aqueous solution of hydrogen peroxide it is best to heat the reaction mixture to near 100° C. When catalytic oxidation with molecular oxygen is employed the best temperature depends upon the concentration of oxygen in the gas and upon the catalyzer and is best determined by experiment. If an oxygen-poor gas such as air is used the oxidation temperature generally is higher than when pure oxygen is used. Higher temperatures advantageously may be used with pure oxygen since under these conditions the least azoxycyclohexane byproduct will be formed.

By passing molecular oxygen containing gas through the reaction mixture small losses of cyclohexylhydroxylamine may occur thru sublimation thereof. Such losses may be minimized if the oxygen gas is passed over instead of through the reaction mixture. The end point of the oxidation may be determined by heating a sample of the reaction mixture with a methanolammonia silver nitrate solution. The presence of cyclohexylhydroxylamine is revealed by the formation of a silver mirror. The oxidation is complete when no silver mirror is formed. If the oxidation is carried out in the presence of solvents which do not dissolve or only sparingly dissolve the cyclohexylhydroxylamine e.g. petroleum ether, cyclohexane, etc., the end of the oxidation is indicated by the disappearance of undissolved cyclohexylhydroxylamine.

The produced cyclohexanone oxime can be recovered from the reaction mixture in known manner e.g. by fractional distillation, extraction or precipitation and is a valuable intermediate for the production of superpolyamids.

Example 1a

A mixture of 65 parts by weight of nitrocyclohexane, 150 parts by weight of methanol and 20 parts by weight of a catalyst having about 1% of palladium carried on calcium carbonate is constantly stirred in a reaction vessel equipped with cooling means and maintained at about 20° C. and at a superatmospheric pressure of 10–20 centimeters of mercury of hydrogen. After about 25 hours the calculated quantity of hydrogen will have been consumed and the cyclohexylhydroxylamine precipitated. The cyclohexylhydroxylamine is then brought into solution in the reaction mixture by warming and the liquid part of the reaction mixture is then separated from the catalyzer by filtration. The filtrate is cooled whereupon the bulk of the cyclohexylhydroxylamine is deposited and separated by filtration. The resulting filtrate is concentrated by evaporation and again cooled to produce a second crop of crystals which are separated by filtration and washed with petroleum ether. The melting point of the product is 141–142° C., and the yield 43.5 parts by weight i.e. 75.5% of the theoretical yield. Unconverted nitrocyclohexane is found in the filtrate and may be recovered by distillation. Considering the recovery of nitrocyclohexane the over all yield of cyclohexylhydroxylamine is 80%. The cyclohexylamine produced amounts to only a trace.

*Example 1b*

Air is introduced into a suspension of 30 parts by weight of cyclohexylhydroxylamine and 2.5 parts by weight of copper powder in 200 parts by weight of cyclohexane maintained at about 10° C. under good agitation. Instead of cyclohexane one may substitute benzol. After 4 hours the suspended cyclohexylhydroxylamine will have been converted by oxidation into cyclohexanone oxime dissolved in the cyclohexane. The mixture is filtered and the filtrate distilled and yields 25.2 parts by weight of cyclohexanone oxime, yield about 85%, having a boiling point of 110–115° C. at 20 mm. pressure.

*Example 2a*

A mixture of 65 parts by weight of nitrocyclohexane, 150 parts by weight of methanol and 10 parts by weight of a catalyst consisting of 1% of palladium on an aluminum oxide carrier maintained at 15–20° C. is treated with hydrogen at a pressure of 100–200 centimeters of water. After 24 hours the reaction mixture is treated as in Example 1a and yields 33 parts by weight of cyclohexylhydroxylamine (yield 75%) and 16 parts by weight of unchanged nitrocyclohexane.

*Example 2b*

Proceeding as described in Example 1b air is introduced into a mixture of 30 parts by weight of cyclohexylhydroxylamine, 200 parts by weight of cyclohexane and 2 parts by weight of copper powder maintained at 10° C. After 3 hours the mixture is filtered and 9.2 parts by weight of cyclohexylhydroxylamine and the 2 parts by weight of copper powder are recovered. From the filtrate, by distillation, 17.5 parts by weight of cyclohexanone oxime are recovered. Yield 85%.

*Example 3*

A mixture of 65 parts by weight of nitrocyclohexane, 160 parts by weight of methanol and 15 parts by weight of a catalyst consisting of about 1% of palladium on calcium carbonate is stirred and maintained at 15° to 20° C. under a hydrogen superatmospheric pressure of 1.5 meters of water. The hydrogen is introduced through a flow meter, the calculated quantity being introduced in 25 hours. At this point the hydrogen in the reaction vessel is replaced by nitrogen, 0.5 part by weight of potassium hydroxide are added and oxygen is then introduced while maintaining the reaction mixture at 60° C. until a sample of the mixture does not give a silver mirror with an ammoniacal methanol solution of silver nitrate. The catalyzer is separated by filtration and the filtrate neutralized and its methanol content distilled out. The residue is then distilled under vacuum and yields 4 parts by weight of nitrocyclohexane and 44 parts by weight of cyclohexanone oxime having a boiling point of 100–110° C. at 11 mm. pressure. This is a yield of 82%. As by-product 3.5 parts by weight of azoxycyclohexane boiling at 170–171° C. at 19 mm. pressure are produced.

We claim:

1. The process for producing cyclohexylhydroxylamine which comprises contacting a methanol solution of nitrocyclohexane with at least one molecular proportion of hydrogen in the presence of a palladium catalyst at a temperature below that at which excessive production of cyclohexylamine occurs and removing the cyclohexylhydroxylamine so formed from the reaction mixture.

2. The process as defined in claim 1 in which the temperature is within the range from about 5° to about 30° C.

3. The process as defined in claim 1 in which the catalyst comprises a carrier and from 0.05 to 5% by weight of palladium.

4. The process as defined in claim 1 in which the catalyst comprises a carrier and about 1% by weight of palladium.

5. A process for the oxidation of cyclohexylhydroxylamine to cyclohexanone oxime which comprises contacting a reaction mixture comprising N-cyclohexyl-hydroxylamine, cyclohexane as a solvent, and copper as a catalyst with elemental oxygen and maintaining said contact until a substantial quantity of oxygen has been absorbed by said reaction mixture.

References Cited in the file of this patent

UNITED STATES PATENTS

| | | |
|---|---|---|
| 2,420,382 | Robertson | May 13, 1947 |
| 2,423,180 | Doumani et al. | July 1, 1947 |

FOREIGN PATENTS

| | | |
|---|---|---|
| 825,544 | Germany | Dec. 20, 1951 |

OTHER REFERENCES

Harries et al.: "Ber. deut. chem.," vol. 31 (1898), pp. 1379–1383.

Harries et al.: "Ber. deut. chem.," vol. 32 (1899), pp. 1348–1349.

Harries et al.: "Ber. deut. chem.," vol. 31 (1898), pp. 1810–1811.

Wallach et al.: "Liebigs Annalen," vol. 279 (1894), pp. 367–369.

Grammaticakis, P.: Compt. rend. 224, pp. 1066–8 (1947).

Ellis: "Hydrogenation of Organic Substances," p. 261, 3rd ed., (1930), D. Van Nostrand Co., N.Y.